No. 871,687. PATENTED NOV. 19, 1907.
R. L. FRINK.
HOISTING GEAR FOR GLASS DRAWING APPARATUS.
APPLICATION FILED MAR. 8, 1906.

4 SHEETS—SHEET 1.

WITNESSES

INVENTOR
Robert L. Frink

No. 871,687. PATENTED NOV. 19, 1907.
R. L. FRINK.
HOISTING GEAR FOR GLASS DRAWING APPARATUS.
APPLICATION FILED MAR. 8, 1906.

4 SHEETS—SHEET 2.

WITNESSES

INVENTOR

No. 871,687. PATENTED NOV. 19, 1907.
R. L. FRINK.
HOISTING GEAR FOR GLASS DRAWING APPARATUS.
APPLICATION FILED MAR. 8, 1906.

4 SHEETS—SHEET 3.

WITNESSES
R A Balderson
Warren W Swartz

INVENTOR
Robert L. Frink
by Bakewell & Byrnes
his attys

No. 871,687. PATENTED NOV. 19, 1907.
R. L. FRINK.
HOISTING GEAR FOR GLASS DRAWING APPARATUS.
APPLICATION FILED MAR. 8, 1906.

4 SHEETS—SHEET 4.

WITNESSES
R A Balderson
Warren W Swartz

INVENTOR
Robert L. Frink
by Bakewell & Byrnes
his attys

UNITED STATES PATENT OFFICE.

ROBERT L. FRINK, OF BELLE VERNON, PENNSYLVANIA, ASSIGNOR TO WINDOW GLASS MACHINE COMPANY, OF PITTSBURG, PENNSYLVANIA, A CORPORATION OF NEW JERSEY.

HOISTING-GEAR FOR GLASS-DRAWING APPARATUS.

No. 871,687.     Specification of Letters Patent.     Patented Nov. 19, 1907.

Application filed March 8, 1906. Serial No. 304,883.

*To all whom it may concern:*

Be it known that I, ROBERT L. FRINK, of Belle Vernon, Fayette county, Pennsylvania, have invented a new and useful Hoisting-Gear for Glass-Drawing Apparatus, of which the following is a full, clear, and exact description, reference being had to the accompanying drawings, forming part of this specification, in which—

Figure 1:
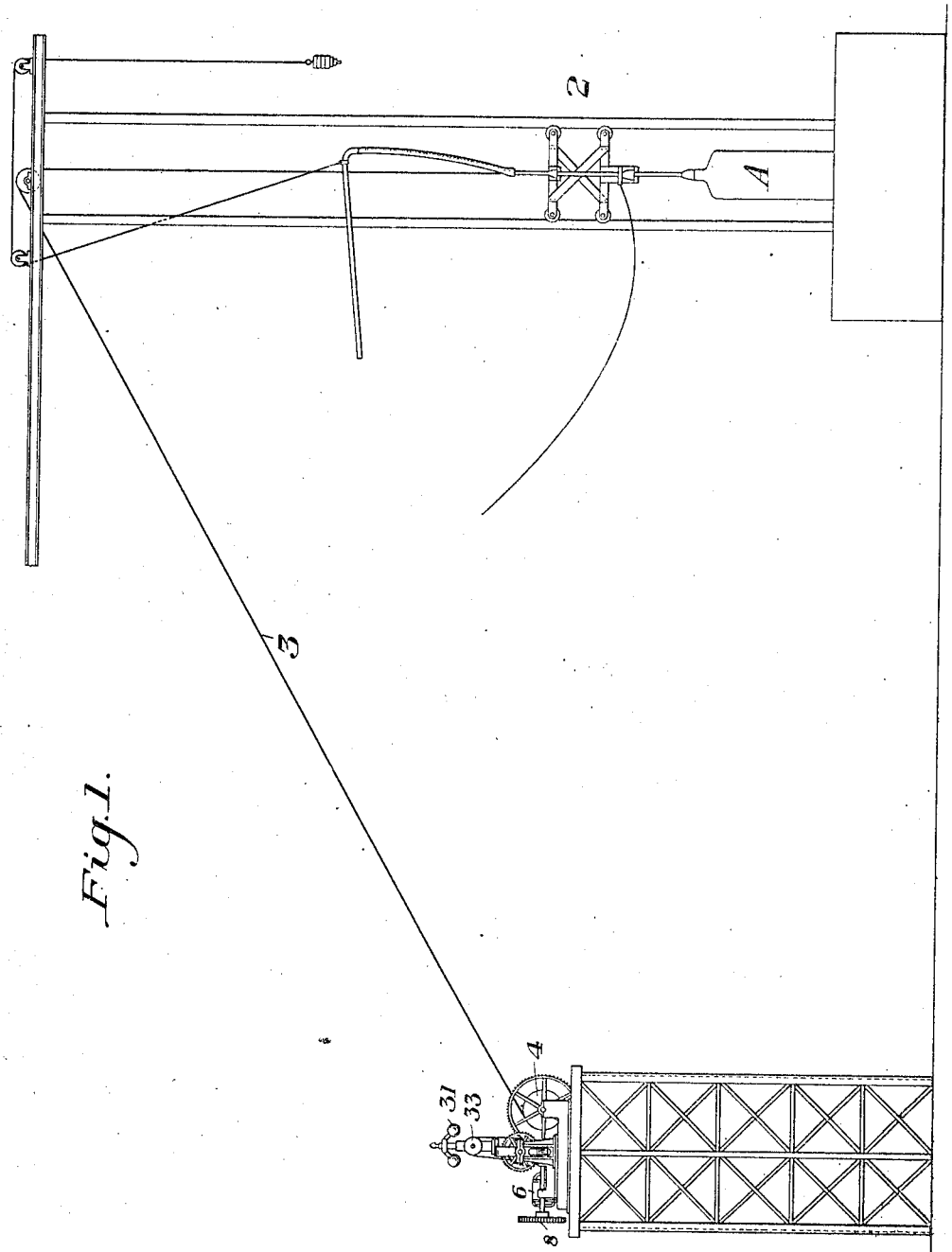
Figure 2:
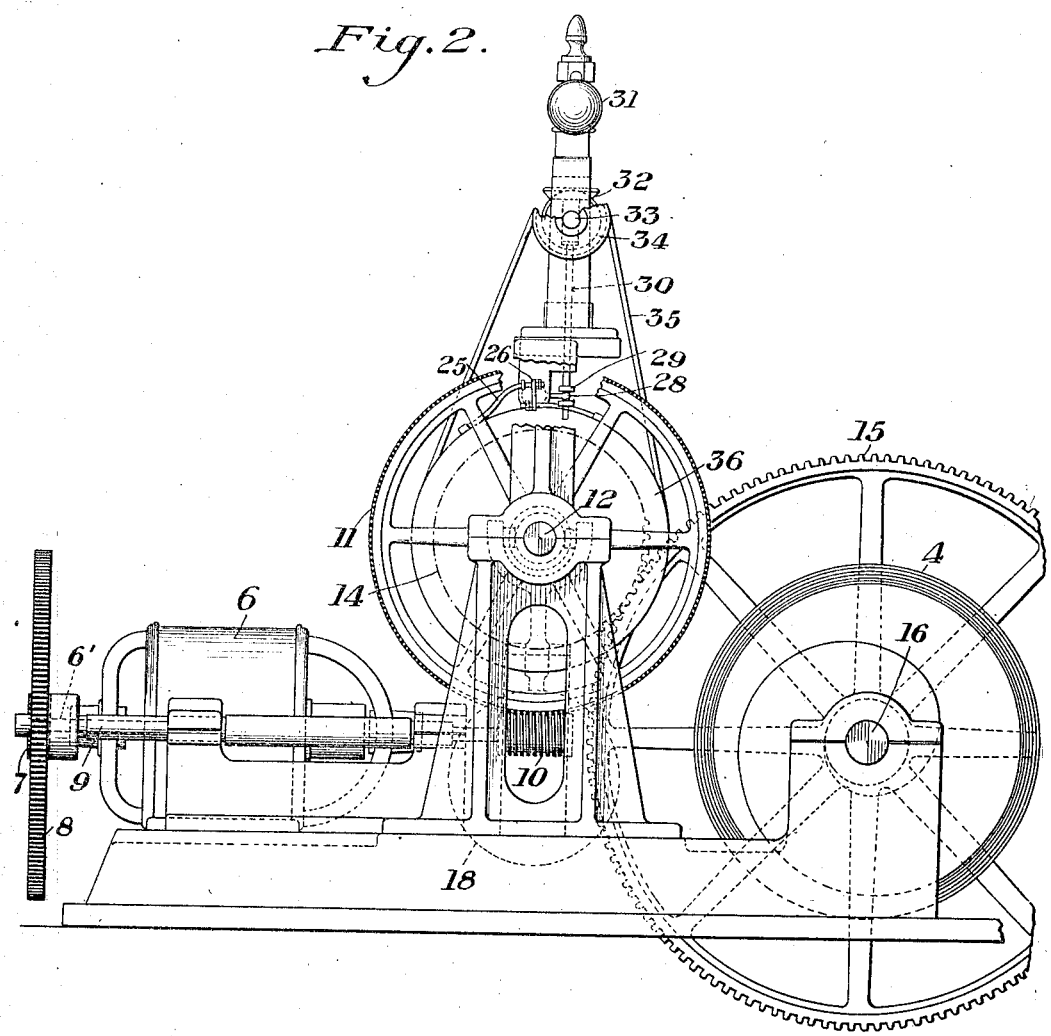
Figure 3:
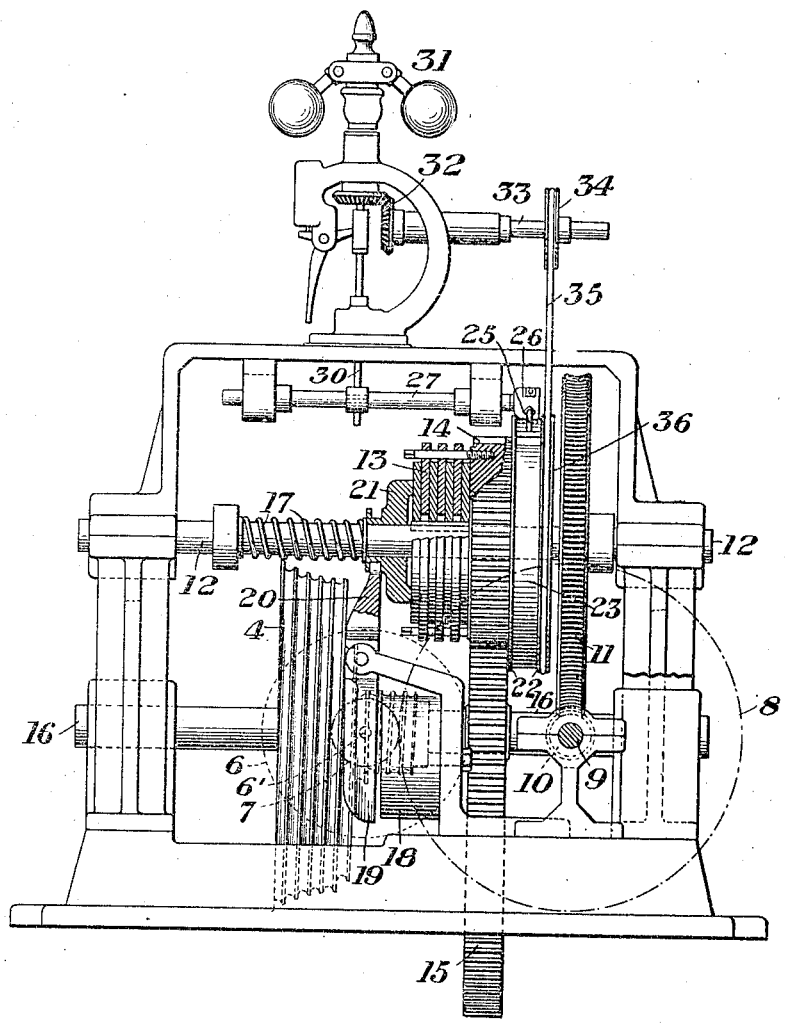
Figure 4:
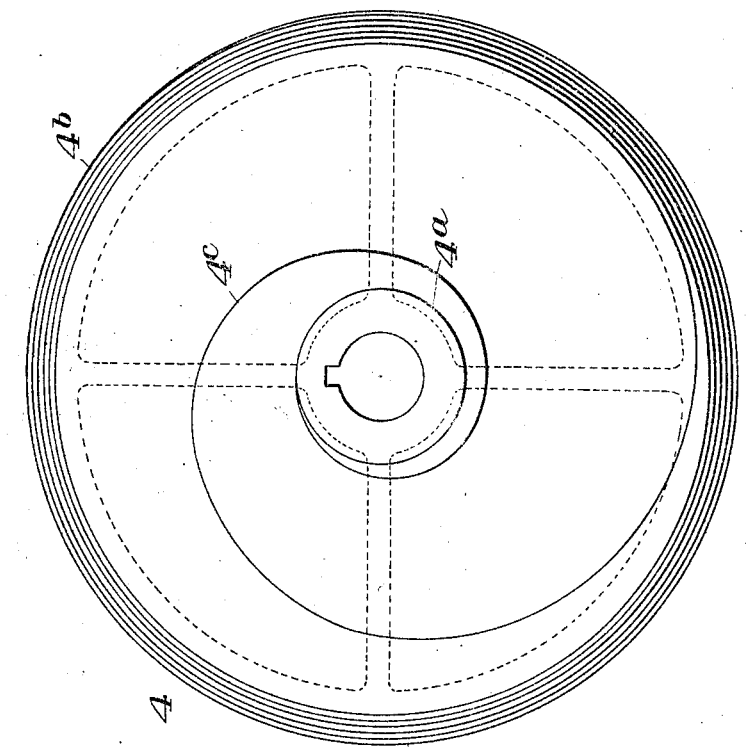
Figure 5:
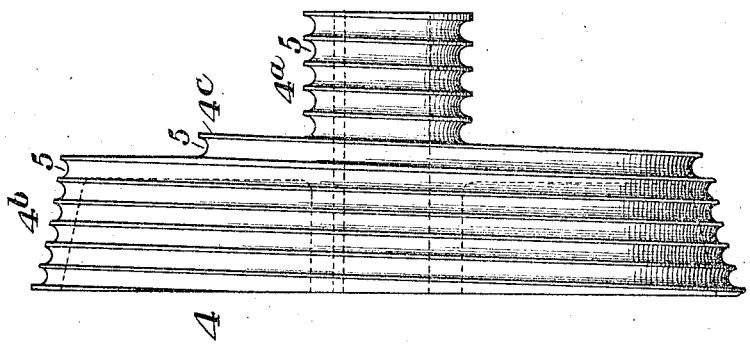

Figure 1 is a general side elevation illustrating the application of the invention; Fig. 2 is a side view of the hoisting gear; Fig. 3 is an end view partly in section of the same; Fig. 4 is an end view of my improved hoisting drum; and Fig. 5 is a side view of the same.

In the operation of drawing glass, it is well known that the speed at which the drawing operation is carried on varies very largely during different portions of the drawing operation. Thus, in drawing a cylinder, the operation is at a comparatively low speed, while the neck portion of the cylinder is being drawn. The speed is again increased for the formation of the cap portion of the cylinder, and there is a further increase while the body of the cylinder is being drawn. To secure the best results the speed should also be varied so as to increase as the glass cools. In other words the increase in speed should be proportional to the decrease in temperature of the glass. It has been difficult heretofore to properly control the speeds by reason of the difficulty in controlling the motor with sufficient accuracy and at the proper times.

The object of my invention is to provide means by which the speed at which the drawing operations are carried on shall be automatically controlled. This I accomplish by the provision of a hoisting drum upon which the rope or cable from the drawing apparatus is wound, and whose winding surface is so constructed as to give the required variation in speed.

My invention also consists in the provision of simple and effective means for automatically controlling the lowering of the glass after it has been drawn; also in the novel construction, combination and arrangement of the parts all substantially as hereinafter described and pointed out in the appended claims.

In the accompanying drawings, the numeral 2 designates glass drawing apparatus of the usual character operated by the rope or cable 3 leading to the hoisting mechanism.

A in Fig. 1 designates a partially drawn glass cylinder.

In accordance with my invention, I provide the hoisting gear with a winding drum 4, to which the rope or cable 3 is connected. This drum has a portion $4^a$ of small diameter, a conical portion $4^b$ of greatly increased diameter, and an intermediate connecting portion $4^c$, the three portions carrying a continuous spiral groove 5 for the cable 3. This drum may be driven by means of any suitable arrangement of gearing. In the drawing I have shown for this purpose an electric motor 6 whose shaft 6' carries a spur pinion 7 meshing with a large gear wheel 8 on a parallel shaft 9. The shaft 9 carries a worm 10 which meshes with a large worm gear wheel 11 which is rigidly secured to a shaft 12. The shaft 12 has loosely mounted thereon a gear wheel 14 which engages a gear wheel 15 on the shaft 16 which carries the drum 4. The wheel 14 is connected to the shaft 12 through the medium of a friction clutch 13, said clutch preferably consisting of a series of alternately arranged fast and loose friction disks as shown in Fig. 3. During the normal drawing operation, these disks are held in driving engagement with each other by means of the spring 17. For the purpose of releasing this clutch I preferably employ an electro-magnet 18 whose armature 19 is carried by a lever 20 which engages the sliding pressure head 21 of the clutch. When the magnet is energized it actuates the lever 20 and thereby the head 21 to release the frictional engagement of the clutch. This clutch is fully described and claimed in the application of H. W. Hitner, Serial No. 257,477, filed April 26th, 1905, and forms no part of my present invention.

The cable 3 has several idle turns around the reduced portion $4^a$ of the drum 4. In commencing to draw a glass cylinder such as shown at A in Fig. 1, the rope or cable 3 commences to wind on the portion $4^a$ at a point adjacent to the connecting portion $4^c$, thus giving a slow speed, while the neck portion of the cylinder is being drawn. The cable then commences to wind on the connecting portion $4^c$, which has such an increase in radius as to give the exact increase in speed which is necessary to form the cap portion of the cylinder. While the cable is winding on the remainder of the connecting portion 4ᶜ, the necessary increase in speed is being obtained for the commencement of the formation of the body portion of the cylinder, after which the cable winds upon the conical portion 4ᵇ of the drum 4. This portion is preferably not a true cone, but is curved in the manner shown in Fig. 5, which curve, together with the progressive increase in its diameter, is proportioned to bear a definite relation to the decrease in temperature of the cooling glass. The exact dimensions and proportions of the winding surfaces of this drum must, of course, be determined in each case with reference to the particular object being drawn. This can be readily determined from the known speeds at which the different portions of the drawing operations are to be conducted.

After the cylinder has been drawn, the magnet 18 is energized to release the friction clutch in the manner before described, and the cylinder is lowered by its own weight, the drum 4 revolving in the reverse direction. In order to prevent undue speed being attained by the descending cylinder, I provide the automatic brake now to be described.

On the shaft 12 is a brake wheel 22, on the periphery of which is a brake band 23, the end portions of which are connected by means of straps 25 with a projecting arm 26 of a rocker shaft 27. This shaft 27 has an arm 28, which is engaged by a collar 29 on a vertically movable spindle 30 which is arranged to be moved by means of a centrifugal governor 31. The governor 31 is driven through the gears 32 by means of a shaft 33 having a belt or band wheel 34 connected by belt 35 with a similar but larger wheel 36 on the shaft 12. By means of this gear the speed of the governor will be proportioned to the speed of the shaft 16 carrying the drum 4. If the speed becomes unduly great, the governor actuates the rock shaft 27 and thereby tightens the brake band 23 on the brake wheel 22, thus immediately checking the speed of the drum 4.

The advantages of my invention result from the simple manner in which I am enabled to automatically regulate and control the speed of the drawing operations without changing the speed of the driving motor; also in the means for automatically preventing the too rapid descent of the drawn glass cylinder, as above described.

What I claim is:—

1. In glass drawing apparatus, a drawing device, a rope or cable connected thereto, and a winding drum for said rope or cable having its winding surface of a definitely increasing radius, the change in which is proportional to the change in temperature of the glass being drawn; substantially as described.

2. In glass drawing apparatus, a hoisting drum having an initial winding portion of relatively small radius, a main winding portion of gradually increasing radius, and an intermediate portion of rapidly increasing radius; substantially as described.

3. In glass drawing apparatus, a winding drum having an initial winding portion of relatively small radius, a main winding portion of curved conical form of gradually increasing radius, and an intermediate portion of rapidly increasing radius; substantially as described.

4. In glass drawing apparatus, a winding drum, gearing for actuating the drum, such gearing having a clutch-controlled member, a fraction brake for said member, and a governor for controlling the friction brake; substantially as described.

5. In glass drawing apparatus, the combination with a winding drum, gearing for operating the drum, a friction brake for the gearing, and a governor operated by the gearing and controlling the brake; substantially as described.

6. In glass drawing apparatus, the combination with a winding drum and gearing for actuating the drum, said gearing having a loose member controlled by a friction clutch, of a brake wheel, a brake band on said wheel, a governor, and connections between the governor and the brake band; substantially as described.

In testimony whereof, I have hereunto set my hand.

ROBERT L. FRINK.

Witnesses:
H. M. CORWIN,
GEO. H. PARMELEE.